United States Patent
Takaoka

(10) Patent No.: US 8,836,961 B2
(45) Date of Patent: Sep. 16, 2014

(54) INFORMATION PROCESSING APPARATUS, IMAGE READER, FILE UPLOAD SYSTEM, AND NON-TRANSITORY COMPUTER READABLE MEDIUM

(75) Inventor: Satoshi Takaoka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 345 days.

(21) Appl. No.: 13/227,815

(22) Filed: Sep. 8, 2011

(65) Prior Publication Data

US 2012/0243035 A1 Sep. 27, 2012

(30) Foreign Application Priority Data

Mar. 25, 2011 (JP) ................. 2011-067445

(51) Int. Cl.
*G06F 3/12* (2006.01)
*H04N 1/00* (2006.01)

(52) U.S. Cl.
CPC ....... *H04N 1/00225* (2013.01); *H04N 1/00464* (2013.01); *H04N 1/00477* (2013.01); *H04N 2201/0081* (2013.01); *H04N 1/00482* (2013.01); *H04N 1/00228* (2013.01)
USPC .......... 358/1.13; 358/1.9; 358/1.15; 345/173; 709/203

(58) Field of Classification Search
USPC ........... 358/1.9, 1.13, 1.15; 345/173; 709/203
See application file for complete search history.

(56) References Cited

U.S. PATENT DOCUMENTS

| | | | |
|---|---|---|---|
| 2001/0052989 A1* | 12/2001 | Okahashi et al. | 358/1.9 |
| 2005/0108353 A1* | 5/2005 | Yamamoto | 709/208 |
| 2009/0244073 A1 | 10/2009 | Uchida | |
| 2010/0027057 A1 | 2/2010 | Fujisawa | |

FOREIGN PATENT DOCUMENTS

| | | |
|---|---|---|
| JP | 2005-149320 A | 6/2005 |
| JP | 2008-210336 A | 9/2008 |
| JP | 2008-229993 A | 10/2008 |
| JP | 2009-239362 A | 10/2009 |
| JP | 2010-035149 A | 2/2010 |

* cited by examiner

*Primary Examiner* — Jamares Q Washington
(74) *Attorney, Agent, or Firm* — Sughrue Mion, PLLC

(57) ABSTRACT

An information processing apparatus includes: an acquisition unit that acquires display data, which includes setup information regarding uploading of an image file, from a server apparatus; a display controller that displays a first screen for receiving a start operation of reading of an image on a display according to the display data acquired by the acquisition unit; a detector that detects the start operation while the first screen is displayed by the display; a reading controller that controls an image reading unit to read an image according to the setup information acquired by the acquisition unit when the start operation is detected by the detector, the image reading generating an image file corresponding to the read image; and an upload unit that uploads the image file generated by the image reading unit to the server apparatus.

13 Claims, 16 Drawing Sheets

FIG. 8

```
<FORM action="cgi-bin/a.cgi" method="post" entype="multipart/form-data">
FILE TO SEND
<INPUT type="file" name="file1" param="color=gray, output=pdf mode=0 cancel=0">
FILE TO SEND
<INPUT type="file" name="file2" param="color=gray, output=pdf mode=0 cancel=0">
FILE TO SEND
<INPUT type="file" name="file3" param="color=gray, output=pdf mode=0 cancel=0">
<INPUT type="submit" value="SEND">
</FORM>
```

FIG. 10B

|  |  | B24 | B25 |

| OTHER SETUP | | CLOSE | DETERMINE |

| IMAGE QUALITY OF DOCUMENT | READ DENSITY | SHARPNESS |
|---|---|---|
| TEXT/PHOTO ▼ | NORMAL ▼ | SLIGHTLY WEAK ▼ |
| BACKGROUND COLOR REMOVAL | CONTRAST | SHOW-THROUGH PREVENTION |
| APPLY ▼ | NORMAL ▼ | DO NOT APPLY ▼ |
| RESOLUTION | READING SIZE | CONTRAST |
| 600dpi ▼ | ▼ | ▼ |
|  | AUTOMATIC DETECTION | UP, DOWN, LEFT, AND RIGHT 2 mm |
| RESOLUTION | READ MAGNIFICATION | |
| 600dpi ▼ | 100% ▼ | |

INFORMATION PROCESSING APPARATUS, IMAGE READER, FILE UPLOAD SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2011-067445 filed Mar. 25, 2011.

BACKGROUND (i) Technical Field

The present invention relates to an information processing apparatus, an image reader, a file upload system, and a non-transitory computer readable medium.

(ii) Related Art

There is a technique of controlling an image reader and an image farming apparatus using a so-called Web browser (or an application equivalent to this).

SUMMARY

According to an aspect of the invention, there is provided an information processing apparatus including: an acquisition unit that acquires display data, which includes setup information regarding the uploading of an image file, from a server apparatus; a display controller that displays a first screen for receiving a start operation of reading of an image on a display according to the display data acquired by the acquisition unit; a detector that detects the start operation while the first screen is displayed by the display; a reading controller that controls an image reading unit to read an image according to the setup information acquired by the acquisition unit when the start operation is detected by the detector, the image reading generating an image file corresponding to the read image; and an upload unit that uploads the image file generated by the image reading unit to the server apparatus.

BRIEF DESCRIPTION OF THE DRAWINGS

Exemplary embodiments of the present invention will be described in detail based on the following figures, wherein:

FIG. 8 is a view illustrating the source of a send screen;

FIGS. 10A and 10B are views showing an example of a setup screen;

DETAILED DESCRIPTION

[Exemplary Embodiments]

Figure 1:
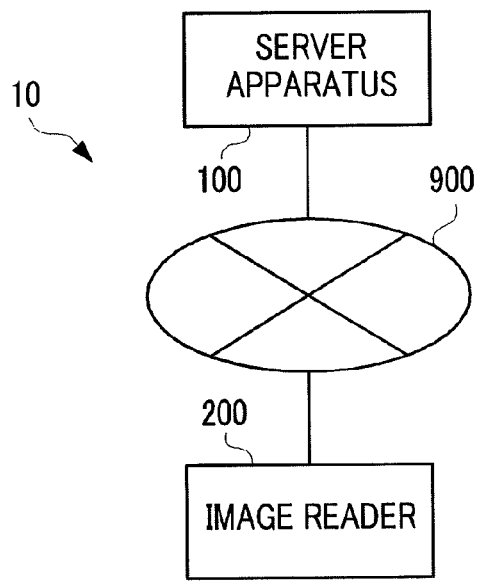
FIG. 1 is a block diagram showing the configuration of a file upload system.

FIG. 1 is a block diagram showing the configuration of a file upload system 10 according to an exemplary embodiment of the invention. As shown in FIG. 1, the file upload system 10 includes at least a server apparatus 100 and an image reader 200 and has a configuration in which the server apparatus 100 and the image reader 200 are communicably connected to each other through a network 900. The network 900 is the Internet or a LAN (Local Area Network), for example. In addition, the file upload system according to the exemplary embodiment of the invention may have a configuration in which the server apparatus 100 and the image reader 200 are directly connected by a cable or wirelessly without using the network 900. In addition, the file upload system according to the exemplary embodiment of the invention may have a configuration in which plural image readers 200 are connected to one server apparatus 100.

The server apparatus 100 is a computer apparatus serving as a Web server, and transmits display data in response to the request from the image reader 200. In addition, the image reader 200 is an electronic apparatus having at least a function of a scanner, that is, a function of reading an image, and includes a configuration equivalent to an example of the information processing apparatus according to the exemplary embodiment of the invention. In addition, the image reader 200 may have a function of a printer, that is, a function of forming an image.

The display data transmitted from the server apparatus 100 is markup data described in a markup language. In the present exemplary embodiment, the markup data is described in a format based on HTML (HyperText Markup Language). In the markup data in the present exemplary embodiment, not only standard elements and standard attributes but also attributes (hereinafter, referred to as "extended attributes"), which are attributes defined in advance and can be interpreted by the image reader 200, are included. In addition, "standard" referred to herein means being standardized, for example, according to the W3C (World Wide Web Consortium). That is, the markup data in the present exemplary embodiment is described in a format in which a part of standard HTML is extended. This markup data is preferably defined by manufacturers who execute the exemplary embodiment of the invention or an industry group including the manufacturers, for example.

The extended attributes are for describing the setup information regarding the upload of an image file. The setup information is information for designating an operation state when uploading an image file. The operation state referred to herein includes various states from a state regarding an operation before the start of reading of an image (user interface or the like) to a state regarding an operation when uploading an image file after reading an image.

Figure 2:
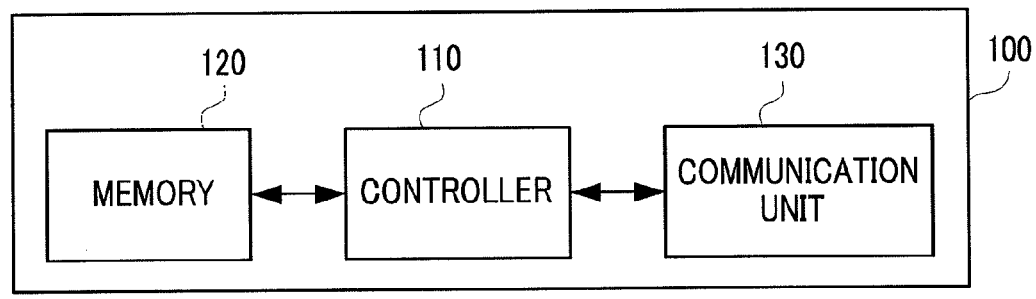
FIG. 2 is a block diagram showing the hardware configuration of a server apparatus.

FIG. 2 is a block diagram showing the hardware configuration of the server apparatus 100. As shown in FIG. 2, the server apparatus 100 includes a controller 110, a memory 120, and a communication unit 130. The controller 110 is a unit that controls an operation of each unit of the server apparatus 100 in order to realize transmission of display data and reception of an image file. The controller 110 includes an arithmetic processing unit, such as a CPU (Central Processing Unit), and a memory equivalent to a main memory, and realizes transmission and reception of data by executing a program. In addition, the controller 11C functions as a unit that generates display data. The memory 120 is a unit that stores data, and is equivalent to an auxiliary memory. The memory 120 may be a magnetic recording media, such as a hard disk, or may be an optical disc or a semiconductor memory. The communication unit 130 is a unit that transmits the data to the image reader 200 through the network 900 or receives the data from the image reader 200 through the network 900, and is equivalent to an example of communication means according to the exemplary embodiment of the invention. The communication unit 130 includes a communication interface device, such as a modem.

Figure 3:
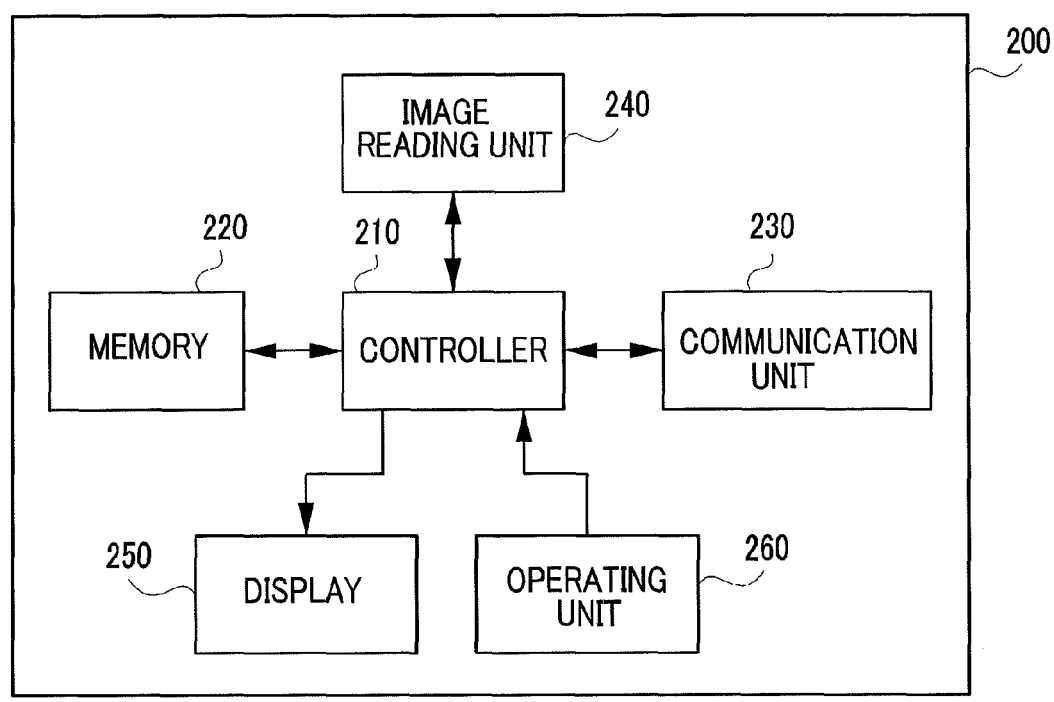
FIG. 3 is a block diagram showing the hardware configuration of an image reader.

FIG. 3 is a block diagram showing the hardware configuration of the image reader 200. As shown in FIG. 3, the image reader 200 includes a controller 210, a memory 220, a communication unit 230, an image reading unit 240, a display 250, and an operating unit 260. In addition to this configuration, the image reader 200 may further include a unit that emits sound, such as a buzzer or a speaker, and an image forming unit that forms an image corresponding to the image data on paper.

The controller 210 is a unit that controls an operation of each unit of the image reader 200. The controller 210 includes an arithmetic processing unit, such as a CPU, and a memory equivalent to a main memory, and realizes transmission and reception of data or reading of an image by executing a program. The memory 220 is a unit that stores data, and is equivalent to an auxiliary memory. The communication unit 230 is a unit that transmits the data to the server apparatus 100 through the network 900 or receives the data from the server apparatus 100 through the network 900, and is equivalent to examples of transmission means and receiving means according to the exemplary embodiment of the invention.

The image reading unit 240 is a unit that reads an image and generates an image file showing the read image, and is equivalent to an example of image reading means according to the exemplary embodiment of the invention. The image reading unit 240 reads an image showing a document optically and generates an image file. The image reading unit 240 includes a configuration (image processing circuit and the like) for generating an image file in a designated format of plural file formats. The file format of an image file is a PDF (Portable Document Format) or JPEG (Joint Photographic Experts Group), for example.

The display 250 is a unit that displays an image, and is equivalent to an example of display means according to the exemplary embodiment of the invention. The display 250 includes a display panel using a liquid crystal display or the like and a driving unit that drives the panel, and displays an image corresponding to the display data supplied from the controller 210. The operating unit 260 is a unit that receives a user operation, and is equivalent to an example of receiving means according to the exemplary embodiment of the invention. In the present exemplary embodiment, the operating unit 260 is a touch screen provided so as to overlap the display panel of the display 250, and supplies to the controller 210 the operation information indicating the coordinates of the position selected by the user. In addition, the receiving means may be a pointing device, such as a mouse, or may be a keyboard or a keypad.

The configuration of the file upload system 10 is as above. Under this configuration, the image reader 200 reads an image on the basis of display data supplied from the server apparatus 100 and uploads the image file to the server apparatus 100. As described above, the display data is described in a format based on HTML. In addition, the uploading of an image file is executed on the basis of RFC (Request for Comments) 1867 (Form-based File Upload in HTML). The image reader 200 has the so-called function of a Web browser in order to realize the displaying of the display data and the uploading of an image file.

Figure 4:
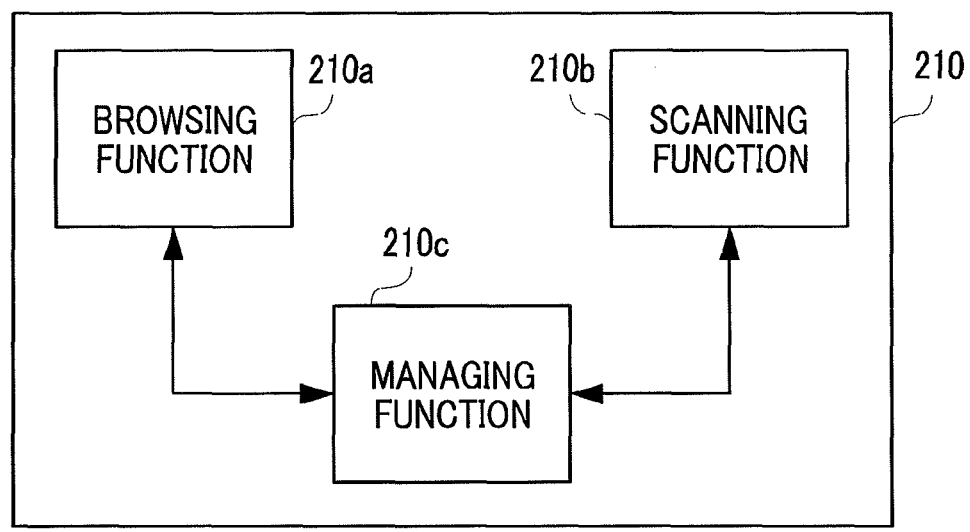
FIG. 4 is a block diagram showing the main parts of the functions realized by the image reader.

FIG. 4 is a block diagram schematically showing a function realized by the controller 210 of the image reader 200. The controller 210 realizes a browsing function 210a, a scanning function 210b, and a managing function 210c when uploading an image file. Each of the functions may be realized by a separate application program, or plural functions may be realized by one application program. The controller 210 realizes a function of the information processing apparatus according to the exemplary embodiment of the invention by realizing the browsing function 210a, the scanning function 210b, and the managing function 210c in combination.

The browsing function 210a is equivalent to a function of a Web browser. That is, the browsing function 210a is a function of interpreting the information (elements, attributes, and the like) described on the display data, which is markup data, and determining a screen displayed on the display 250. In addition, the browsing function 210a has a function of interpreting the extended attributes described above and transmitting the attribute value (that is, setup information) to the managing function 210c. In addition, the browsing function 210a has a function of receiving an image file through the managing function 210c and uploading the image file. "Uploading" referred to herein means transmitting the image file generated by the image reading unit 240 to the server apparatus 100.

The scanning function 210b is a function of controlling an operation of the image reading unit 240. The scanning function 210b includes a function of receiving the setup information regarding the upload of an image file and making a control such that reading of an image is executed according to the received setup information. Such setup is determined either by the setup information included in the display data or by the user operation. The scanning function 210b includes a function of displaying a screen for receiving the user operation when the setup regarding the upload of an image file is determined by the user operation. Unlike the display data transmitted from the server apparatus 100, the display data for displaying the screen does not necessarily need to be markup data. In addition, the scanning function 210b includes a function of transmitting the image file generated by the image reading unit 240 to the managing function 210c.

The managing function 210c is a function of managing the data relevant to the upload of an image file and mediating the exchange of data between the browsing function 210a and the scanning function 210b. The managing function 210c includes a function of transmitting the setup information interpreted by the browsing function 210a to the scanning function 210b and a function of transmitting the image file generated by the scanning function 210b to the browsing function 210a.

Figure 5:
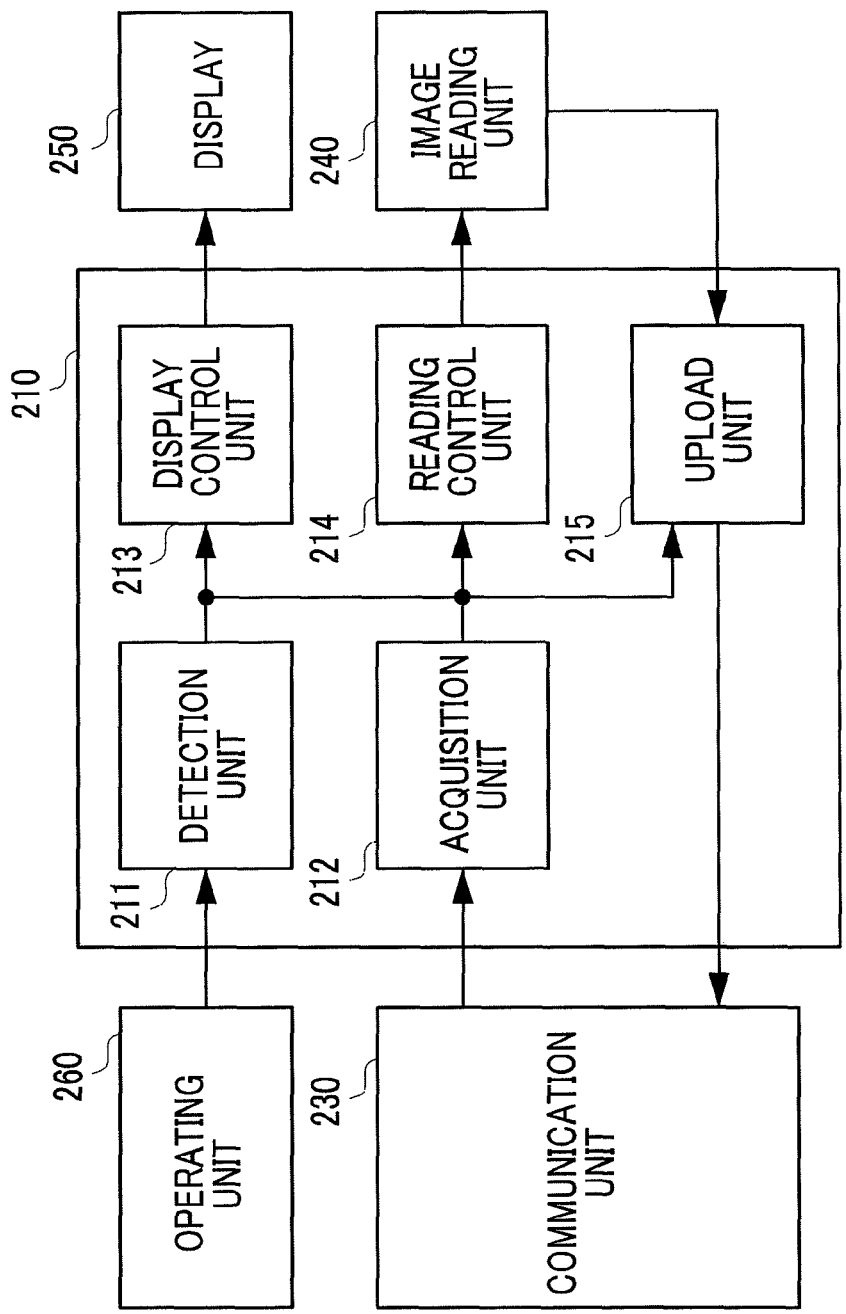
FIG. 5 is a functional block diagram showing the functional configuration of a controller of the image reader.

FIG. 5 is a functional block diagram showing the functional configuration of the controller 210 more specifically. In order to realize the browsing function 210a, the scanning function 210b, and the managing function 210c described above, the controller 210 realizes functions equivalent to a detector 211, an acquisition unit 212, a display control unit 213, a reading control unit 214, and an upload unit 215 that are shown in FIG. 5.

The detector 211 is a unit that detects a user operation, and is equivalent to an example of detection means according to the exemplary embodiment of the invention. The detector 211 detects which kind of operation the user has performed on the basis of the operation information supplied from the operating unit 260 and the screen displayed by the display 250 at the time of operation.

The acquisition unit 212 is a unit that acquires the display data transmitted from the server apparatus 100, and is equivalent to an example of acquisition means according to the exemplary embodiment of the invention. The acquisition unit 212 acquires the display data, which is markup data, through the communication unit 230. That is, "acquisition" referred to herein is equivalent to the downloading of display data.

The display control unit 213 is a unit that controls the display of the display 250, and is equivalent to an example of display control means according to the exemplary embodiment of the invention. The display control unit 213 displays a screen corresponding to the display data acquired by the acquisition unit 212 and also displays a screen corresponding to the operation detected by the detector 211. In addition, the "screen" referred to herein is a window, for example, and does not need to occupy the whole display region. The display control unit 213 allows displaying plural, screens simultaneously, for example, like displaying another screen so as to overlap a certain screen.

The reading control unit 214 is a unit that controls the reading of the image reading unit 240, and is equivalent to an example of reading control means according to the exemplary embodiment of the invention. The reading control unit 214 operates the image reading unit 240 on the basis of the setup information included in the display data acquired by the acquisition unit 212. Specifically, the reading control unit 214 controls the operation of the image reading unit 240 so that an image is read according to the setup information or an image file is generated according to the setup information.

The upload unit 215 is a unit that uploads an image file generated by the image reading unit 240, and is equivalent to an example of uploading means according to the exemplary embodiment of the invention. The upload unit 215 uploads an image file according to the setup information included in the display data acquired by the acquisition unit 212, and restricts uploading when necessary.

Preferably, the upload unit 215 executes the uploading of plural image files in parallel. That is, the upload unit 215 uploads another image file while uploading a certain image file when necessary. In this case, a limiting variable of the number of image files which can be uploaded in parallel may be included in the setup information included in display data. This limiting variable is appropriately set according to the performance or the like of the server apparatus 100 or the network 900. In addition, the function of uploading plural image files in parallel is not a function necessarily required for the upload unit according to the exemplary embodiment of the invention.

Figure 6:
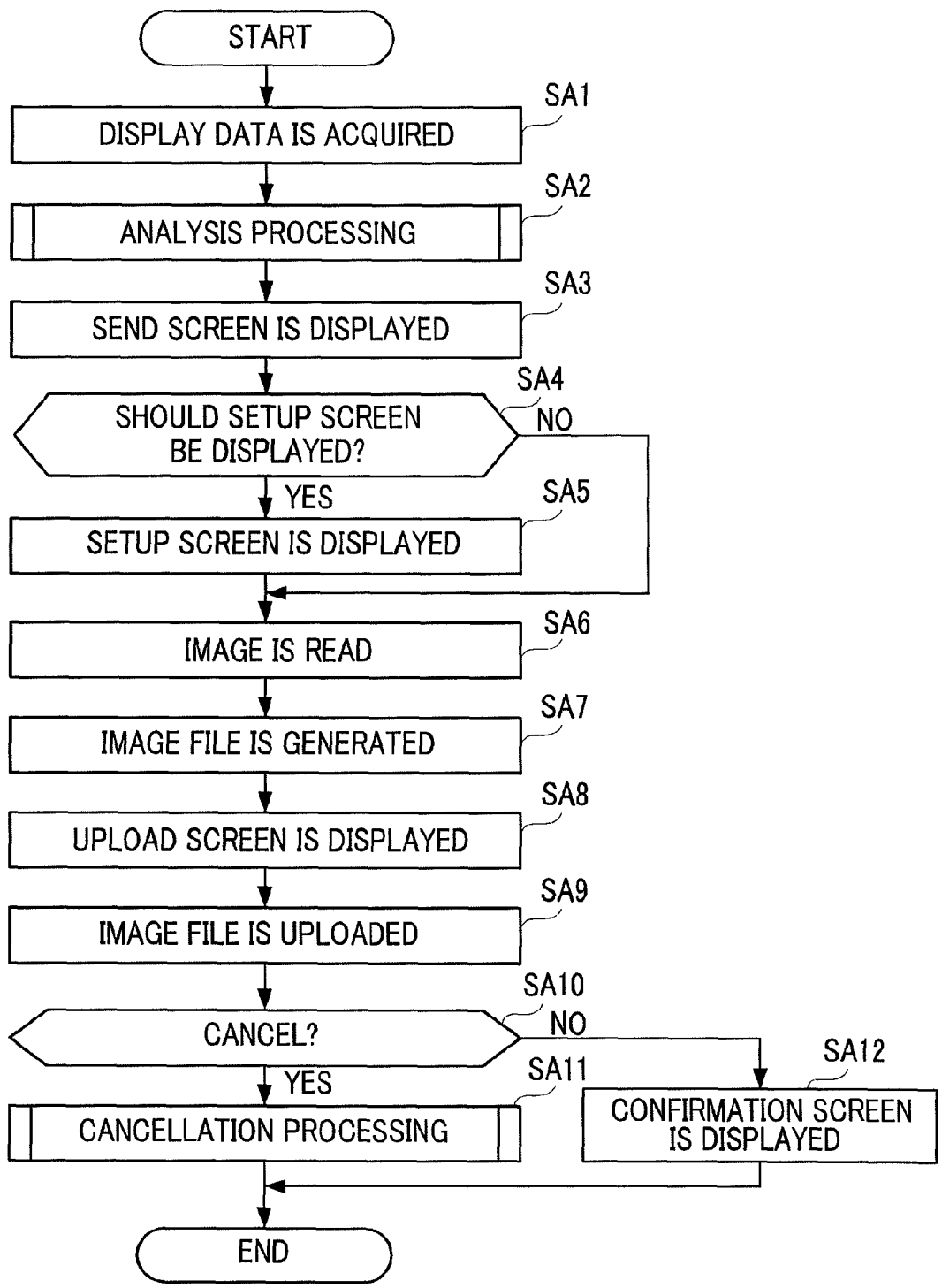
FIG. 6 is a flow chart showing an operation of the image reader.

FIG. 6 is a flow chart showing the outline of an operation when the image reader 200 uploads an image file. In addition, the operation shown in FIG. 6 is an example of a representative operation of the image reader 200. In practice, the image reader 200 operates in plural kinds of operation methods without being limited to the operation method shown in FIG. 6. In addition, although processing of receiving and detecting the user operation is included in the operation of the image reader 200, the step is omitted in the flow chart shown in FIG. 6.

First, the controller 210 of the image reader 200 acquires the display data from the server apparatus 100 through the communication unit 230 (step SA1). Then, the controller 210 executes analysis processing for analyzing the acquired display data (step 3A2), and displays a screen corresponding to display data on the display 250 (step SA3). The screen displayed at this time is referred to as a "send screen" hereinbelow. The send screen is equivalent to an example of a first screen according to the exemplary embodiment of the invention.

Figure 7:
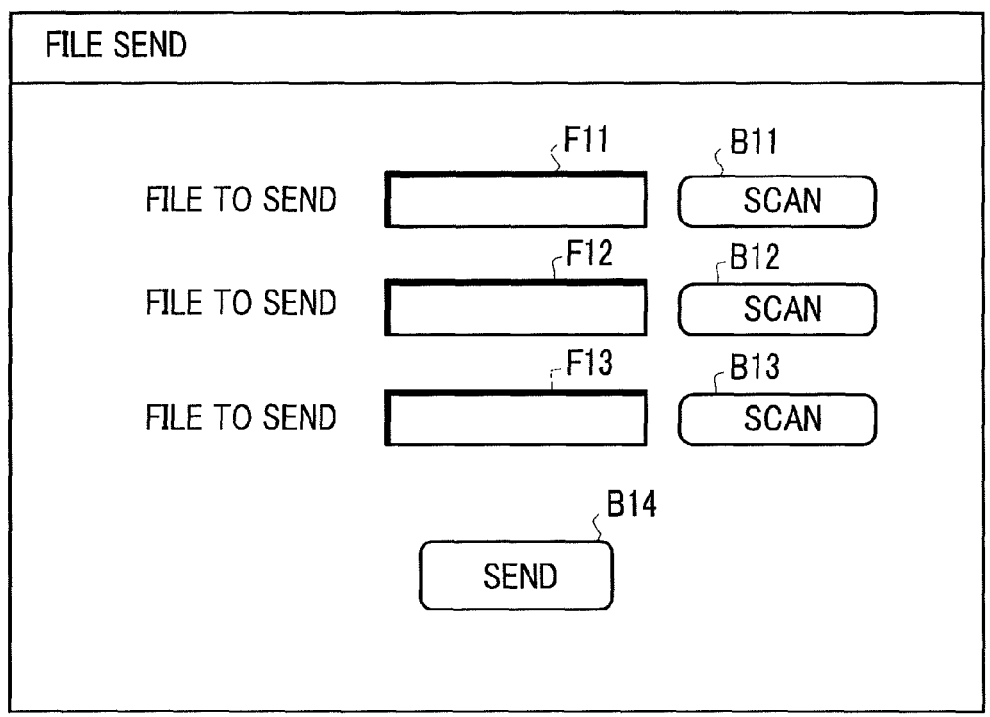
FIG. 7 is a view showing an example of a send screen.

FIG. 7 is a view showing an example of the send screen. As shown in FIG. 7, the send screen is a screen including input fields F11, F12, and F13 of a file name (or a file path), scan buttons B11, 312, and 313, and a send button B14. In addition, although the number of input fields and the number of scan buttons are "3 (that is, 3 sets)" herein, the number of input fields and the number of scan buttons may be larger or smaller than 3. It is preferable that the server apparatus 100 generate the display data in which the number of input fields and the number of scan buttons are different when necessary.

In addition, in standard HTML, the scan buttons B11, B12, and B13 generally have a function in which a character string "reference . . . " is displayed and a dialog for file selection is displayed when this is selected. However, the image reader 200 is configured such that a character string "scan" is displayed on the scan buttons B11, B12, and B13 of the send screen and a setup screen, which will be described later, is displayed when this is selected.

FIG. 8 is a view illustrating a part of the source (markup data itself) of the send screen shown in FIG. 7. In practice, the markup data of the send screen is configured to include other elements, such as an <HTML> tag and a <BODY> tag. In FIG. 8, underlined parts are equivalent to extended attributes, and the other elements are standard HTML. That is, in this example, the extended attribute is a part of the attributes of INPUT elements.

A param attribute is an example of the setting value showing the conditions when reading an image (hereinafter, referred to as "read conditions"). This setting value is a condition which can be set on the setup screen which will be described later. For example, a part "color=gray" of the value of the param attribute indicates that a "gray scale (monochrome gray-scale level-s)" is designated as a color mode. As a color mode, for example, "color" or "monochrome 2 gray-scale levels" may also be designated in addition to the "gray-scale". For example, a part "output=pdf" of the value of the param attribute indicates that a PDF is designated as a file format of an image file.

A mode attribute is an example of read mode information indicating an input state of the setting conditions regarding the reading of an image. In the present exemplary embodiment, the read mode information indicates one of four kinds of modes of "0" to "3". In addition, a cancel attribute is an example of cancel mode information indicating a cancellation state of upload of an image file. In the present exemplary embodiment, the cancel mode information indicates one of three kinds of modes of "0" to "2". Since specific states of these modes will be described together with an operation to be described later, the explanation will be omitted herein.

The analysis processing in step SA2 is a processing of interpreting the markup data received as display data and specifying objects (a character, an image, a button, an input field, and the like) displayed as a send screen and also specifying the extended attributes designated from the server apparatus 100. Specifying the object displayed on the send screen in the analysis processing is equivalent to a so-called parser.

Figure 9:
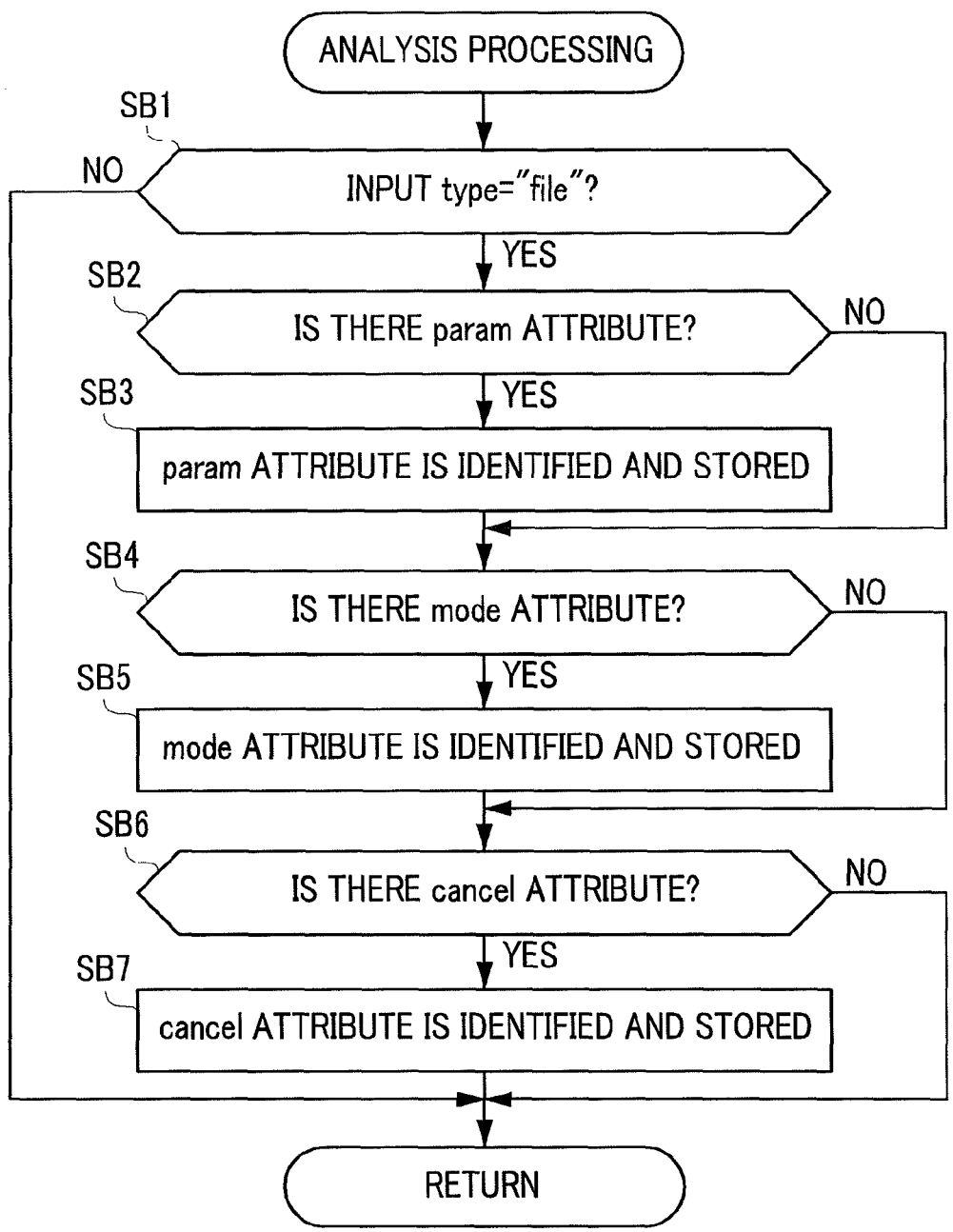
FIG. 9 is a flow chart showing analysis processing.

FIG. 9 is a flow chart illustrating processing for specifying the extended attribute in the analysis processing. In this analysis processing, first, the controller 210 determines whether or not an element describing the extended attribute is included in the display data. In the present exemplary embodiment, the extended attribute is used when uploading an image file by a FORM element. Therefore, the controller 210 determines whether or not the value is "file" referring to the type attribute of an INPUT element herein (step SB1). When the type attribute whose value is "file" is not included in the display data, the controller 210 determines that it is not necessary to specify the extended attribute and ends this processing.

On the other hand, when the type attribute whose value is "file" is included in the display data, the controller 210 identifies the setup information designated by the extended attribute and stores it in a memory. In the present exemplary embodiment, the controller 210 determines whether or not the param attribute, the mode attribute, and the cancel attribute described above are described (steps SB2, SB4, and SB6). When these extended attributes are described, the controller 210 identifies the attribute values and stores them in a memory (steps SB3, SB5, and SB7).

In addition, the order of the processing for determining whether or not there is an extended attribute and storing the attribute value is not limited to the example shown in FIG. 9. In addition, the controller 210 is configured to be able to identify the attribute value and store it in a memory for other setup information such as count mode information, which will be described later, in the same manner as for the param attribute and the like, when necessary, without being limited to the setup information of the extended attribute shown in FIG. 9.

The controller 210 displays a send screen in step SA3 through such analysis processing. The controller 210 stores the specific content of the setup information in a memory even though it is not necessary to display it on the send screen. In addition, although not shown in the drawing, the controller 210 may display the content of all or some of the setup information on the send screen.

After the send screen is displayed, the controller 210 determines whether to display a setup screen next (step SA4). Whether to display the setup screen is determined by the attribute value of the mode attribute. If the attribute value of the mode attribute is "0", the controller 210 displays a setup screen according to the operation of a scan button (step SA5). If the attribute value of the mode attribute is not "0", the controller 210 does not display the setup screen even if the scan button is selected. Then, the controller 210 executes reading of an image (step SA6) and generation of an image file (step SA7) in response to the user operation (start operation to be described later).

The setup screen is a screen for inputting the read conditions, and is equivalent to an example of a second screen according to the exemplary embodiment of the invention. Although the controller 210 may change the screen displayed on the display 250 from the send screen to the setup screen, the controller 210 may also display the setup screen so as to overlap the send screen like the so-called pop-up display. In addition, the setup screen is a screen displayed by the scanning function 210b, and does not necessarily need to be described by the markup data. On the other hand, the send screen is a screen which is described by the markup data and is displayed by the browsing function 210a.

Figure 10A:
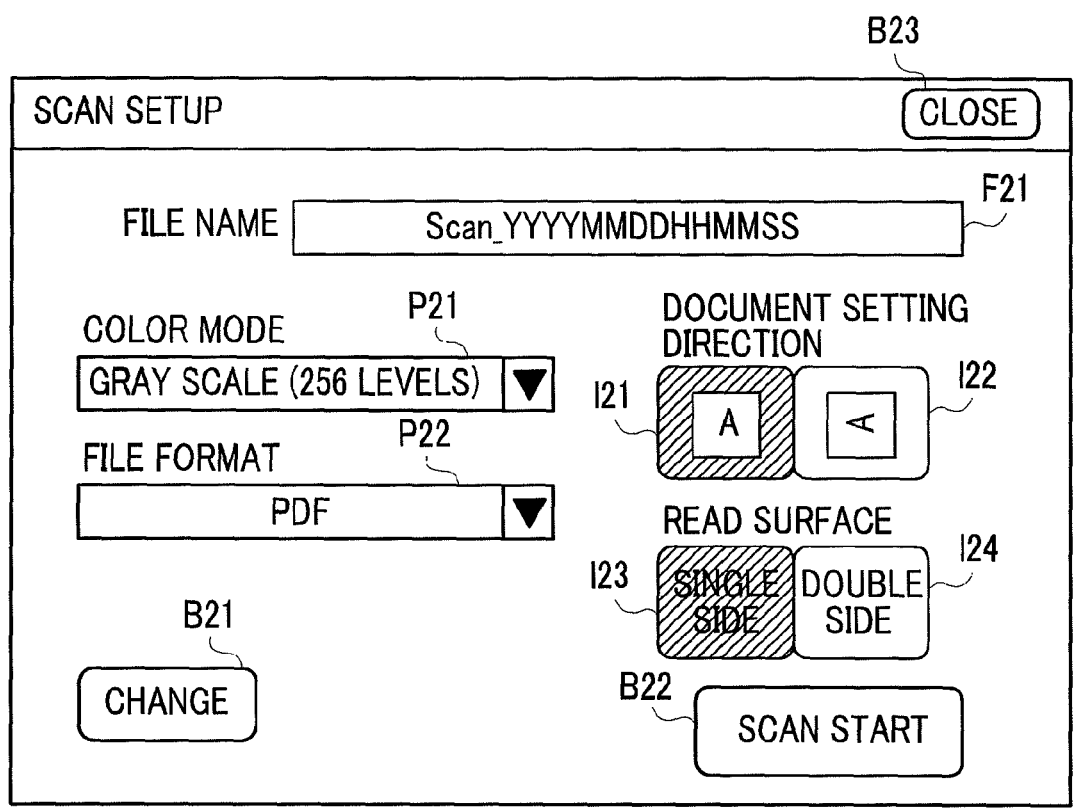

FIGS. 10A and 10B are views showing an example of the setup screen. In addition, the setup screen is two screens herein. However, the setup screen may be one screen or may be three or more screens. The screen shown in FIG. 10A is a screen which is first displayed as a setup screen, and this is called a "first setup screen" hereinbelow. On the other hand, the screen shown in FIG. 10B is a screen displayed when necessary and is also a screen displayed when a change button B21 is selected on the screen shown in FIG. 10A, and this is called a "second setup screen" hereinbelow.

The first setup screen includes an input field F21 of a file name, a pull-down menu P21 of a color mode, a pull-down menu P22 of a file type, and icons I21, I22, I23, and I24 for selecting the direction of a document or the surface information. These objects are for receiving the operation of setting the read conditions. The read conditions are set in advance as initial values. For example, file names are appropriately set on the basis of date and time or the like such that they do not overlap each other. First, the controller 210 displays the initial value on the setup screen. When there is a user operation, the controller 210 changes the setting value to change the read conditions. Although the initial values of the read conditions are set in advance in the image reader 200, priority is given to the setting value based on the param attribute when the initial values of the read conditions are set from the server apparatus 100 side by the param attribute described above.

In addition, the first setup screen includes the change button B21, a scan start button B22, and a close button B23. The change button B21 is an object for changing the displayed setup screen from the first setup screen to the second setup screen. In addition, the scan start button B22 is an object for starting the reading of an image. The close button B23 is an object for canceling the user setting, and is also an object for changing the operated screen from the setup screen to the send screen by making the setup screen not be displayed.

The second setup screen includes plural pull-down menus for setting the read conditions, such as the image quality of a document. Initial values of the read conditions are set in advance and are changed by the user operation. In addition, priority is also given to the setting value based on the param attribute when the initial values of the read conditions are set from the server apparatus 100 side by the param attribute. In addition, the second setup screen includes a close button B24 and a determine button B25. The close button B24 is an object for canceling the user setting. On the other hand, the determine button B25 is an object for changing the operated screen from the second setup screen to the first setup screen by making the user determine the user setting on the second setup screen.

Specifically, the read mode information in the present exemplary embodiment is information set for the following operation. That is, when the read mode information is "0", the controller 210 displays the first setup screen in response to an operation of selecting the scan button and receives a user operation of setting the read condition (hereinafter, referred to as a "setting operation"). In this case, the user selects the scan button on the send screen to confirm the setup screen and changes the read conditions when necessary, and then selects the scan start button. As a result, the image reader 200 starts the reading of an image according to the read conditions changed by the user and generates an image file. Then, the image reader 200 starts the uploading of the image file when the send button is selected by the user.

The operation when the read mode information is "0" is equivalent to an operation when the read mode information according to the exemplary embodiment of the invention indicates a second mode. In this case, the operation of selecting the scan button is equivalent to a start operation according to the exemplary embodiment of the invention. On the other hand, the operation when the read mode information is not "0" is equivalent to an operation when the read mode information according to the exemplary embodiment of the invention indicates a first mode.

When the read mode information is "1", the controller 210 starts the reading of an image without displaying the setup screen when an operation of selecting the scan button is performed and generates an image file. In this case, conditions set in advance are used as the read conditions. Then, the image reader 200 starts the uploading of the image file when the send button is selected by the user. Also in this case, the operation of selecting the scan button is equivalent to a start operation according to the exemplary embodiment of the invention.

When the read mode information is "2", the controller 210 starts the reading of an image according to the read conditions set in advance without displaying the setup screen when an operation of selecting the scan button is performed and generates an image file. The operation so far is the same as that when the read mode information is "1". Here, when the read mode information is "2", the controller 210 starts the uploading of an image file immediately after the image file is prepared, without receiving a user operation of selecting the send button. For this reason, the user is to perform only an operation of selecting the scan button, and it is not necessary to perform an operation of selecting the send button. Accordingly, the controller 210 may not display the send button on the send screen when the read mode information is "2".

When the read mode information is "3", the controller 210 receives an operation of selecting the send button instead of an operation of selecting the scan button. In this case, the user is to perform only an operation of selecting the send button, and it is not necessary to perform an operation of selecting the scan button. In this case, therefore, the operation of selecting the send button is equivalent to a start operation according to the exemplary embodiment of the invention. In addition, the controller 210 may not display the scan button on the send screen when the read mode information is "3".

As described above, when the setup screen is displayed (that is, when the read mode information is "0"), the image reader 200 receives a setting operation from the user. On the other hand, when the setup screen is not displayed (that is, when the read mode information is not "0"), the image reader 200 reads an image according to the read conditions set in advance without receiving a setting operation from the user. Therefore, the server apparatus 100 transmits the display data in which the value of the read mode information is set to "0" when it is necessary to fix the read conditions, and transmits the display data in which the value of the read mode information is set to values other than "0" when it is necessary to give a choice to the user. In addition, setting the value of the read mode information to one of "1" to "3" is preferably determined according to the number of files uploaded in parallel or the user's convenience.

When uploading an image file (step SA9), the controller 210 displays a screen showing the upload situation (hereinafter, referred to as an "upload screen") on the display 250 (step SA8). In addition, the upload screen may be displayed at any timing from the start of the uploading of an image file to the end of the uploading. In addition, the upload screen may be displayed instead of the send screen (that is, screen change) or may be displayed as a pop-up so as to overlap the send screen.

An object showing the upload progress of an image file or an object for receiving an operation of canceling the upload of an image file (hereinafter, referred to as a "cancel operation") is displayed on the upload screen. The upload screen is equivalent to an example of a third screen according to the exemplary embodiment of the invention. However, the third screen does not necessarily need to display the upload progress, and may be a screen on which the cancel operation can be received.

Figure 11:
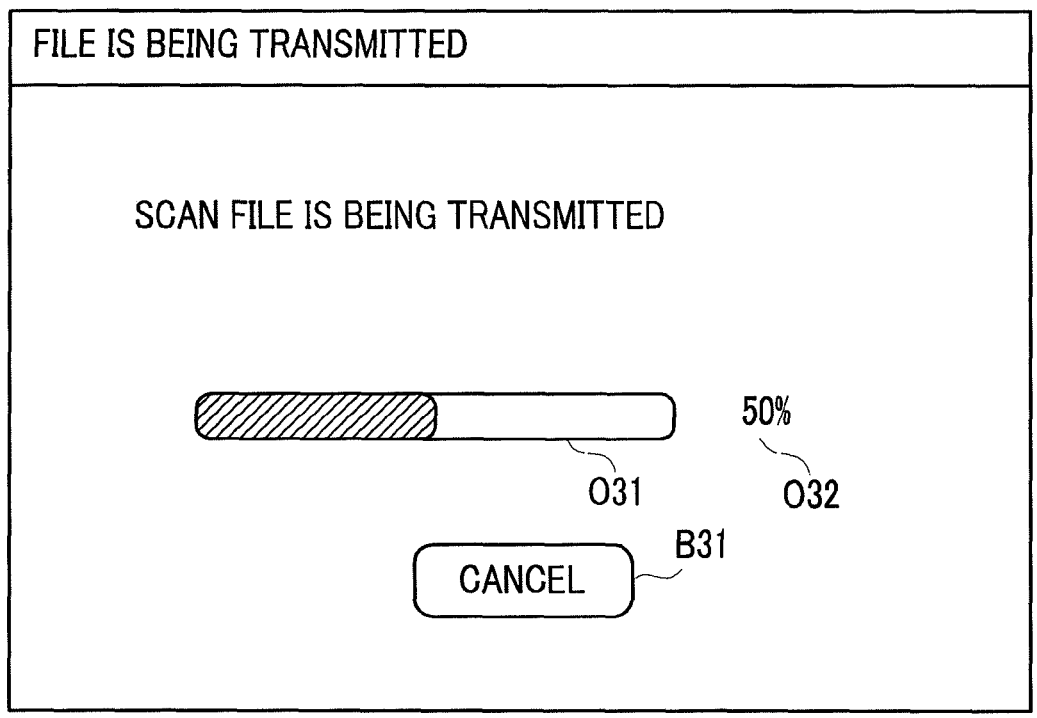
FIG. 11 is a view showing an example of an upload screen.

FIG. 11 is a view showing an example of the upload screen. The upload screen includes a progress bar, objects O31 and O32 for percentage display, and a cancel button B31. In addition, display states of the objects O31 and O32 change according to the ratio of the uploaded data capacity to the total data capacity of an image file. The cancel button B31 is an object for receiving a cancel operation.

The controller 210 determines whether or not the cancel button on the upload screen has been selected (step SA10), and changes the operation according to the determination result. When the cancel button is not selected, the controller 210 displays a screen for notification of "upload has been completed" (hereinafter, referred to as a "confirm screen") after the end of upload (step SA12). On the other hand, when the cancel button has been selected, the controller 210 executes cancellation processing for canceling the uploading (step SA11). The operation method in the cancellation processing (hereinafter, referred to as a "cancel method") differs depending on the cancel mode information described above.

Figure 12:
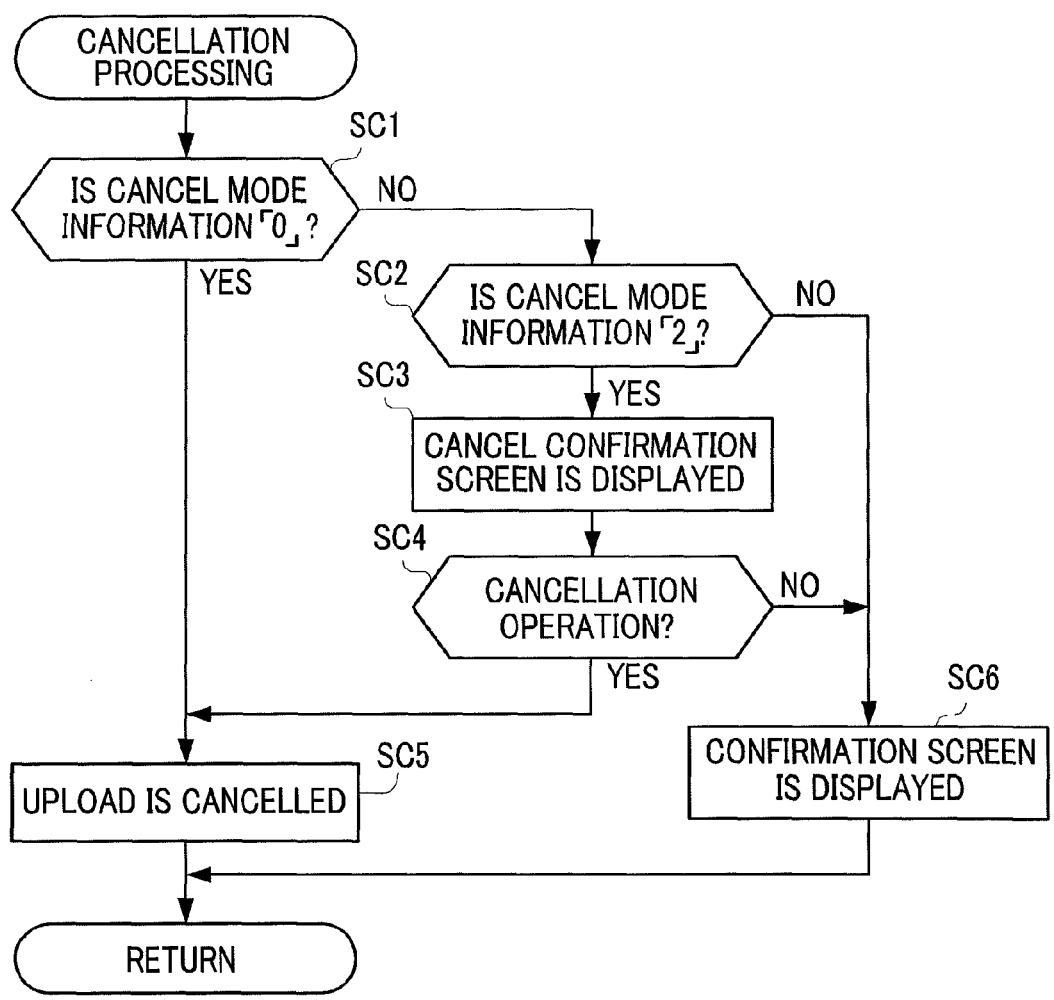
FIG. 12 is a flow chart showing cancellation processing.

FIG. 12 is a flow chart showing the cancellation processing. In this cancellation processing, first, the controller 210 determines the value of cancel mode information. Here, the controller 210 determines whether or not the value of the cancel mode information is "0" (step SC1). When the value of the cancel mode information is not "0", the controller 210 determines whether or not the value of the cancel mode information is "2" (step SC2). Thus, the controller 210 performs case division for three modes of "0", "1", and "2". In addition, the cases where the value of the cancel mode information is "0", "1", and "2" correspond to cases indicating the first, second, and third modes according to the exemplary embodiment of the invention, respectively.

When the value of the cancel mode information is "0", the controller 210 executes cancellation of the uploading in response to the user operation (step SC5). That is, the controller 210 does not interrupt the cancellation of the uploading in this case. On the other hand, when the value of the cancel mode information is "1", the controller 210 restricts the cancellation of the uploading so as not to be executed even if the user selects a cancel button. In this case, the controller 210 displays the confirm screen described above after the uploading of the image file ends (step SC6).

In addition, when the value of the cancel mode information is "2", the controller 210 makes the user select whether to cancel the uploading. Specifically, the controller 210 demands confirmation of a user by displaying as a pop-up a screen for confirmation of the uploading cancellation (hereinafter, referred to as a "cancel confirm screen") on the display 250 (step SC3), and determines the detected operation (step SC4). In this case, when an operation of canceling the uploading is received, the controller 210 cancels the upload (step SC5). When the operation is not received, the controller 210 continues the uploading and displays a confirm screen after the end of the uploading (step SC6).

Figure 13:
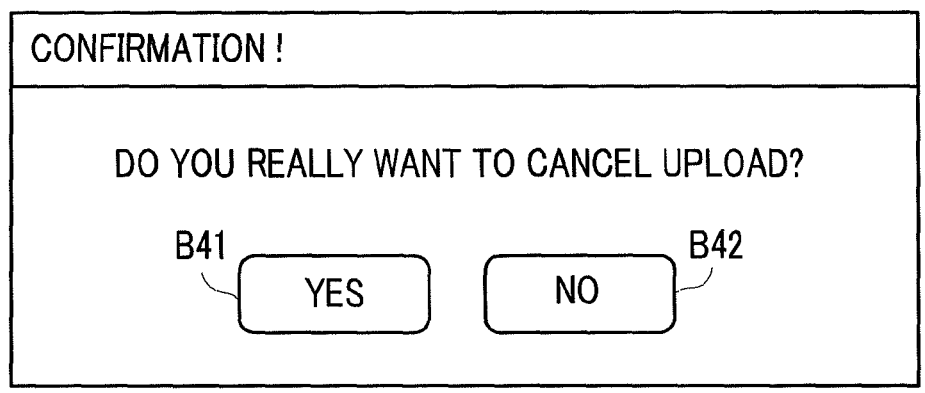
FIG. 13 is a view showing an example of a cancel confirm screen.

FIG. 13 is a view showing an example of the cancel confirm screen. On the cancel confirm screen, a message, such as "Do you really want to cancel the upload", to the user is displayed and a YES button B41 and a NO button B42 to respond to the message are also displayed. The user selects the YES button B41 when the user wants to cancel the uploading and selects the NO button B42 when the user does not want to cancel the uploading. The cancel confirm screen is equivalent to an example of a third screen according to the exemplary embodiment of the invention.

Figure 14:
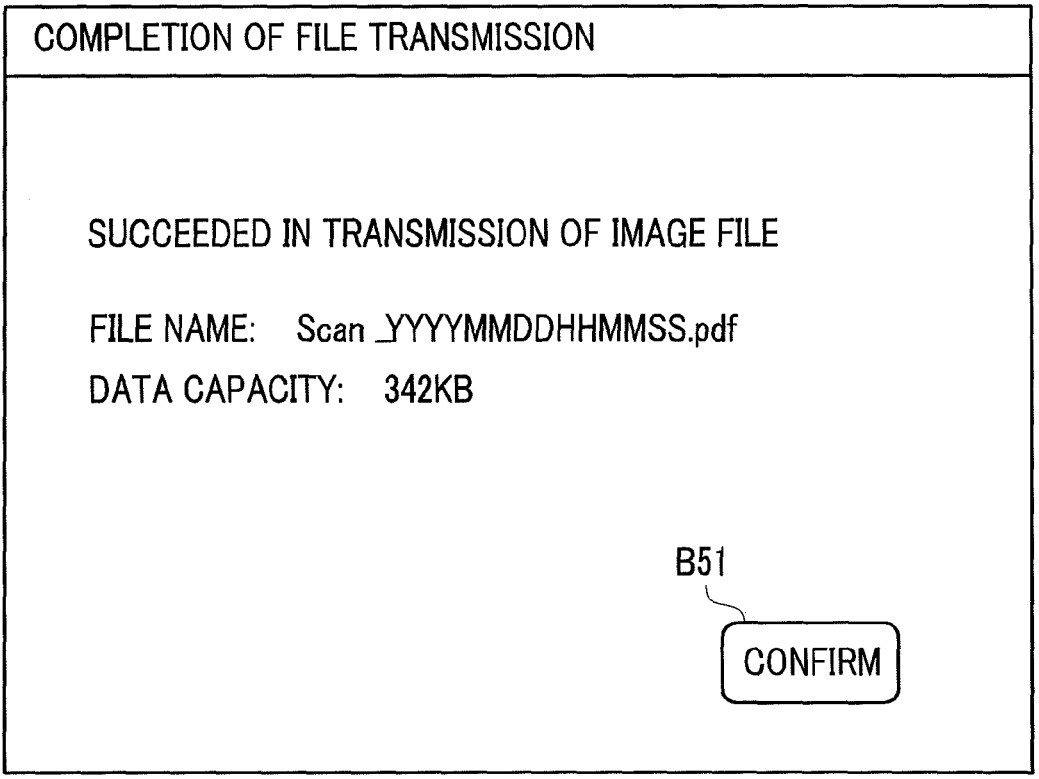
FIG. 14 is a view showing an example of a confirm screen.

FIG. 14 is a view showing an example of the confirm screen displayed in step SA12. A message requesting the confirmation of a user is displayed on the confirm screen. This message is an execution result of processing, such as "Image file has successfully been transmitted" or "Transmission of an image file has failed", or a file name of an image file which is successfully uploaded (or not successfully uploaded), for example. In addition, the confirm screen includes a confirm button B51 for recognizing it at the apparatus side that the user has confirmed the screen. The confirm screen is equivalent to an example of a fourth screen according to the exemplary embodiment of the invention. In addition, the display data for displaying the confirm screen is markup data transmitted from the server apparatus 100. Accordingly, the confirm screen is a screen displayed by the browsing function 210a.

When a user selects the confirm button 351, the controller 210 makes the confirm screen not displayed. In this case, the controller 210 may return the display screen to a send screen or may display another screen (not shown). Hereinbelow, the operation of selecting the confirm button B51 is called a "confirmation operation".

[Modifications]

The exemplary embodiment of the invention is not limited to those described above, but the following modifications may also be made, for example. In addition, these modifications may be appropriately combined when necessary.

(First modification)

The designation of the server apparatus 100 may include various operations regarding the reading of an image or the procedure in the image reader 200 without being limited to the read conditions, the input state, and the cancellation state of the uploading described above. For example, the server apparatus 100 may designate an operation method when executing the uploading of plural image files in parallel by display data (setup information included in display data).

Figure 15:
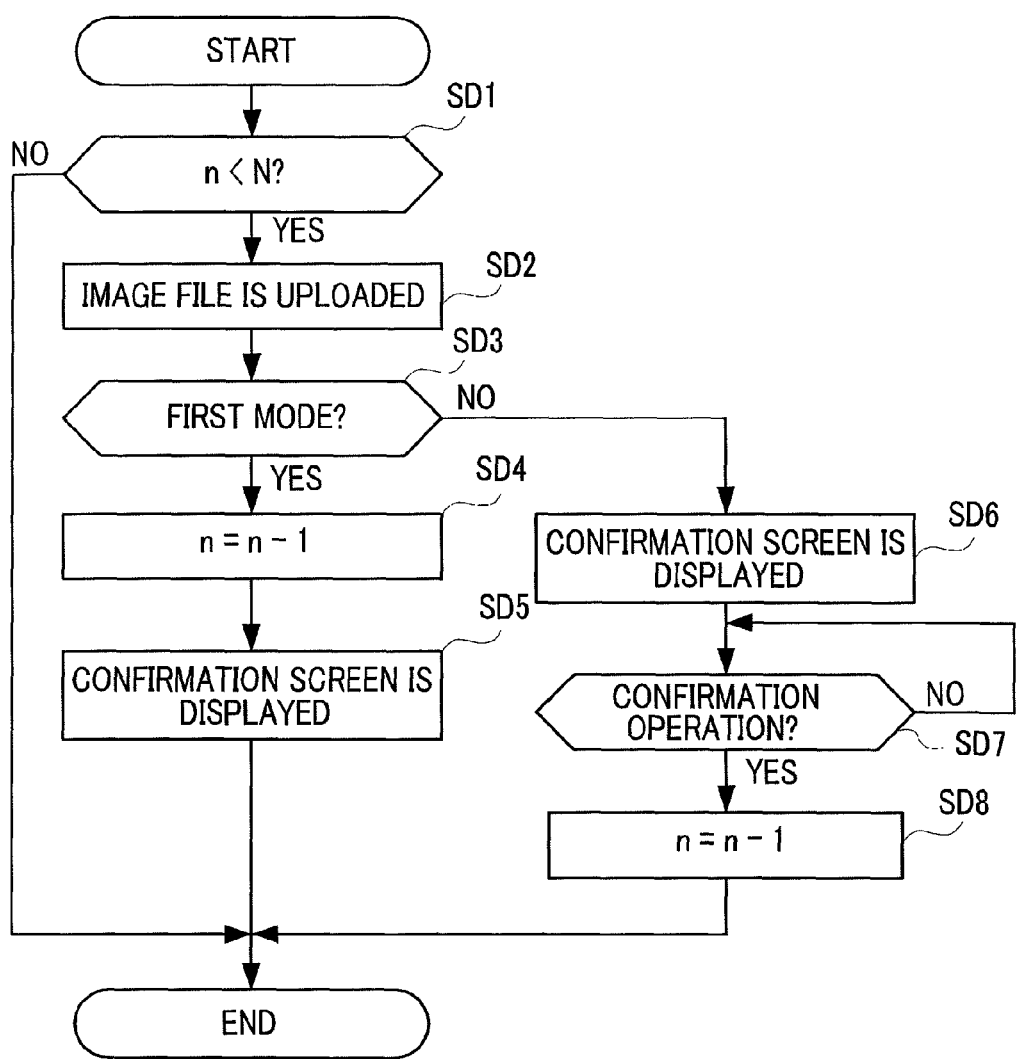
FIG. 15 is a flow chart showing a counting method of the count value.

FIG. 15 is a flow chart showing the processing when uploading an image file, and shows a counting method of a count value. The controller 210 executes processing shown in FIG. 15 whenever newly uploading an image file. That is, the controller 210 executes this processing in parallel for as many as the number of the image files. In addition, the count value n referred to herein is the number of image files uploaded in parallel, and the controller 210 stores the count value n in a memory. The controller 210 unloads plural image files such that the count value does not exceed the limiting variable N. In addition, the limiting variable may be a value designated by the setup information from the server apparatus 100, or may be a value set in advance in the image reader 200.

When uploading an image file, the controller 210 determines whether or not the count value at that time is smaller than the limiting variable (step SD1). If the count value is equal to the limiting variable, the controller 210 prohibits the uploading of the image file. That is, the controller 210 does not receive the uploading of a new image file until the count value becomes smaller than the limiting variable. In this case, the controller 210 may display a message, such as "The image file cannot be uploaded now" or "Please upload a little later", on the display 250.

On the other hand, if the count value is smaller than the limiting variable, the controller 210 uploads the image file (step SD2). In addition, cancellation or failure of the uploading is not considered herein. After the uploading of the image file ends, the controller 210 displays a confirm screen. However, the controller 210 changes the processing when displaying the confirm screen according to the setup information. The setup information used at this time is referred to as "count mode information" hereinbelow. The count mode information is described in display data as an extended attribute indicating either "0" or "1", and is specified by the analysis processing described above. Here, it is assumed that the case where the value of the count mode information is "0" is a first mode and the case where the value of the count mode information is "1" is a second mode.

The controller 210 determines whether the count mode information indicates the first mode or the second mode with reference to the value stored in a memory (step SD3). In the first mode, the controller 210 decreases the count value after the upload of the image file ends (step SD4), and then displays a confirm screen (step SD5). That is, in the first mode, the controller 210 decreases the count value without waiting for the confirmation operation. In addition, the controller 210 may not display the confirm screen in the first mode.

On the other hand, in the second mode, the controller 210 uploads an image file and then displays a confirm screen before decreasing the count value (step SD6), and determines whether or not a confirmation operation has been received (step SD7). Then, the controller 210 decreases the count value after detecting the confirmation operation (step SD8).

As described above, the counting method of the count value charges according to the count mode information. In the first mode, when the uploading of an image file ends, the count value is decreased. Accordingly, transition to a state where the next image file can be uploaded is performed without waiting for the confirmation operation of the user. On the other hand, in the second mode, the count value is not decreased until the user performs a confirmation operation. Accordingly, image files the number of which exceeds the count value are not sequentially uploaded.

Figure 16:
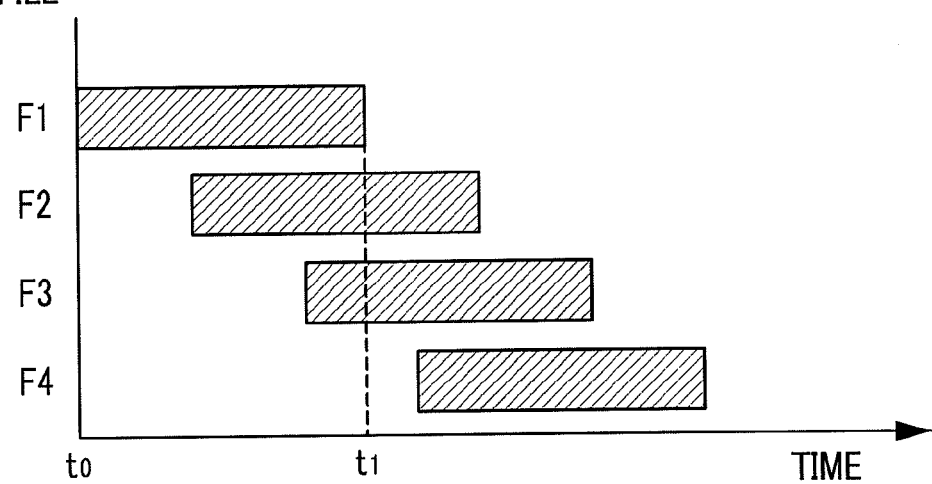
FIG. 16 is a view for explaining the difference between an operation method when the count mode information indicates a first mode and an operation method when the count mode information indicates a second mode.

FIG. 16 is a view for explaining the difference between the operation methods in the first and second modes. In this example, the limiting variable (that is, the number of files which can be uploaded in parallel) of the count value is assumed to be "3". In addition, shaded portions in FIG. 16 show a period for which an image file has been uploaded. For example, in the case of an image file F1, it means that the uploading starts at time $t_0$ and ends at time $t_1$.

In this case, the image reader 200 sets an image file F4 so as to be able to be uploaded any time after time $t_0$ in the first mode. In the second mode, however, since the count value is still "3" even after time $t_1$ if a confirmation operation on the image file F1 is not received from the user, the image reader 200 sets the image file F4 so as not to be able to be uploaded.

(Second modification)

The markup data does not necessarily need to be described by HTML. For example, the markup data may be described by XML (Extensible Markup Language) or may be described by other standard markup languages defined on the basis of HTML or XML. In addition, the setup information may not be the HTML itself and may be embedded by scripts, such as JavaScript.

In addition, the setup information does not necessarily need to be described using attributes unlike the exemplary embodiment described above, and may be described using elements. For example, in the param attribute example described above, there is "param" as an attribute and "color=gray" is designated as the value. However, instead of this, it is also possible to define an element "PARAM" and define the color mode by the attribute called "color". In this case, if the color mode is a gray scale, it is preferable to set the attribute value of the color attribute to "gray".

(Third modification)

The invention may be executed in a situation where an image reader and an information processing apparatus are separately provided. The information processing apparatus in this situation is a personal computer connected to the image reader, for example. Alternatively, the information processing apparatus is a radio communication terminal, such as a smart phone, or may be connected to a server apparatus through a radio communication network.

In addition, the invention may be provided not only as the information processing apparatus or the file upload system including the information processing apparatus but also as a program causing a computer to function as an information processing apparatus or a non-transitory computer readable medium in which such a program is recorded. In addition, the non-transitory computer readable medium according to the exemplary embodiment of the invention may be acquired from an external device through a network or another communication unit and be downloaded to the computer.

The foregoing description of the exemplary embodiments of the invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   an acquisition unit that acquires display data, which includes setup information regarding uploading of an image file, from a server apparatus,
      wherein the setup information includes a setting value indicating conditions of image reading;
   a display controller that displays a first screen for receiving a start operation of reading of an image on a display according to the display data acquired by the acquisition unit;
   a detector that detects the start operation while the first screen is displayed by the display;
   a reading controller that controls an image reading unit to read an image according to the setup information acquired by the acquisition unit when the start operation is detected by the detector, the image reading generating an image file corresponding to the read image; and
   an upload unit that uploads the image file generated by the image reading unit to the server apparatus,
   wherein the setup information includes read mode information indicating an input state of the conditions.
   wherein when the read mode information indicates a first mode, the reading controller controls the image reading unit to read an image using the setting value included in the setup information as the conditions, and
   wherein when the read mode information indicates a second mode, the display controller controls the display a second screen, which is a screen for receiving a setting operation of setting the conditions and has the setting value as an initial value of the conditions.

2. The information processing apparatus according to claim 1,
   wherein the detector detects the setting operation when the second screen is displayed by the display, and
   wherein the reading controller controls the image reading unit to read an image using the conditions set in advance or detected by the detector.

3. The information processing apparatus according to claim 1,
   wherein the setup information includes cancel mode information indicating a cancellation state of uploading an image file,
   the display controller controls the display to display a third screen for receiving an cancel operation of canceling the uploading until the upload unit ends the uploading of the image file,
   the detector detects the cancel operation while the third screen is displayed by the display, and
   the upload unit cancels the uploading when the cancel operation is detected by the detector when the cancel mode information indicates a first mode, does not cancel the uploading when the cancel operation is detected by the detector when the cancel mode information indicates a second mode, and allows a user to select whether to cancel the uploading when the cancel operation is detected by the detector when the cancel mode information indicates a third mode.

4. The information processing apparatus according to claim 2,
   wherein the setup information includes cancel mode information indicating a cancellation state of uploading an image file,
   the display controller controls the display to display a third screen for receiving an cancel operation of canceling the uploading until the upload unit ends the uploading of the image file,
   the detector detects the cancel operation while the third screen is displayed by the display, and
   the upload unit cancels the uploading when the cancel operation is detected by the detector when the cancel mode information indicates a first mode, does not cancel the uploading when the cancel operation is detected by the detector when the cancel mode information indicates a second mode, and allows a user to select whether to cancel the uploading when the cancel operation is detected by the detector when the cancel mode information indicates a third mode.

5. The information processing apparatus according to claim 1,
   wherein the setup information includes count mode information indicating a counting state of the number of files when executing uploading of image files in parallel,
   the upload unit uploads the image files such that the count value becomes equal to or smaller than a limiting variable, which is set in advance, while counting the image files uploaded in parallel,
   when the count mode information indicates a first mode, the upload unit decreases the count value when uploading of the image file ends,
   when the count mode information indicates a second mode, the display controller controls the display to display a fourth screen that shows an execution result of the upload when the upload unit executes uploading of the image file and that is a screen for receiving a confirmation operation indicating that the screen has been confirmed,
   the detector detects the confirmation operation while the fourth screen is displayed by the display, and
   the upload unit decreases the count value when the confirmation operation is detected by the detector.

6. The information processing apparatus according to claim 2, wherein the setup information includes count mode information indicating a counting state of the number of files when executing uploading of image files in parallel, the upload unit uploads the image files such that the count value becomes equal to or smaller than a limiting variable, which is set in advance, while counting the image files uploaded in parallel, when the count mode information indicates a first mode, the upload unit decreases the count value when uploading of the image file ends, when the count mode information indicates a second mode, the display controller controls the display to display a fourth screen that shows an execution result of the upload when the upload unit executes uploading of the image file and that is a screen for receiving a confirmation operation indicating that the screen has been confirmed, the detector detects the confirmation operation while the fourth screen is displayed by the display, and the upload unit decreases the count value when the confirmation operation is detected by the detector.

7. The information processing apparatus according to claim 3, wherein the setup information includes count mode information indicating a counting state of the number of files when executing uploading of image files in parallel, the upload unit uploads the image files such that the count value becomes equal to or smaller than a limiting variable, which is set in advance, while counting the image files uploaded in parallel, when the count mode information indicates a first mode, the upload unit decreases the count value when uploading of the image file ends, when the count mode information indicates a second mode, the display controller controls the display to display a fourth screen that shows an execution result of the upload when the upload unit executes uploading of the image file and that is a screen for receiving a confirmation operation indicating that the screen has been confirmed, the detector detects the confirmation operation while the fourth screen is displayed by the display, and the upload unit decreases the count value when the confirmation operation is detected by the detector.

8. An image reader comprising:

a receiver that receives display data, which includes setup information regarding uploading of an image file, from a server apparatus, wherein the setup information includes a setting value indicating conditions of image reading;

a display that displays a first screen for receiving a start operation of reading of an image according to the display data received by the receiver;

a receiving unit that receives the start operation while the first screen is displayed by the display;

an image reading unit that reads an image according to the setup information received by the receiver and generates an image file corresponding to the read image when the start operation is received by the receiving unit; and a transmitter that transmits the image file generated by the image reading unit to the server apparatus, wherein the setup information includes read mode information indicating an input state of the conditions, and wherein when the read mode information indicates a first mode, the image reading unit is controlled to read an image using the setting value included in the setup information as the conditions, and wherein when the read mode information indicates a second mode, the display is controlled to display a second screen, which is a screen for receiving a setting operation of setting the conditions and has the setting value as an initial value of the conditions.

9. A file upload system comprising:

the image reader according to claim 8; and a server apparatus including a generation unit that generates the display data and a communication unit used to transmit the display data to the image reader and receive the image file from the image reader.

10. A non-transitory computer readable medium that stores a program causing a computer to execute a process, the process comprising:

acquiring display data, which includes setup information regarding uploading of an image file, from a server apparatus, wherein the setup information includes a setting value indicating conditions of image reading;

displaying a first screen for receiving a start operation of reading of an image on a display according to the acquired display data;

detecting the start operation while the first screen is displayed by the display;

controlling an image reading unit to read an image according to the setup information acquired by the acquisition step when the start operation is detected, the image reading unit generating an image file corresponding to the read image; and uploading the image file generated by the image reading unit to the server apparatus, wherein the setup information includes read mode information indicating an input state of the conditions, and wherein the process further comprises:

when the read mode information indicates a first mode, controlling the image reading unit to read an image using the setting value included in the setup information as the conditions, and when the read mode information indicates a second mode, controlling the display to display a second screen, which is a screen for receiving a setting operation of setting the conditions and has the setting value as an initial value of the conditions.

11. An information processing apparatus comprising:

an acquisition unit that acquires display data, which includes setup information regarding uploading of an image file, from a server apparatus, wherein the setup information includes a setting value indicating conditions of image reading;

a display controller that displays a first screen for receiving a start operation of reading of an image on a display according to the display data acquired by the acquisition unit;

a detector that detects the start operation while the first screen is displayed by the display;

a reading controller that controls an image reading unit to read an image according to the setup information acquired by the acquisition unit when the start operation is detected by the detector, the image reading generating an image file corresponding to the read image; and an upload unit that uploads the image file generated by the image reading unit to the server apparatus, wherein the setup information includes cancel mode information indicating a cancellation state of uploading an image file, the display controller controls the display to display a third screen for receiving an cancel operation of canceling the uploading until the upload unit ends the uploading of the image file, the detector detects the cancel operation while the third screen is displayed by the display, and the upload unit cancels the uploading when the cancel operation is detected by the detector when the cancel mode information indicates a first mode, does not cancel the uploading when the cancel operation is detected by the detector when the cancel mode information indicates a second mode, and allows a user to select whether to cancel the uploading when the cancel operation is detected by the detector when the cancel mode information indicates a third mode.

12. An information processing apparatus comprising:

an acquisition unit that acquires display data, which includes setup information regarding uploading of an image file, from a server apparatus,
wherein the setup information includes a setting value indicating conditions of image reading;

a display controller that displays a first screen for receiving a start operation of reading of an image on a display according to the display data acquired by the acquisition unit;

a detector that detects the start operation while the first screen is displayed by the display;

a reading controller that controls an image reading unit to read an image according to the setup information acquired by the acquisition unit when the start operation is detected by the detector, the image reading generating an image file corresponding to the read image; and an upload unit that uploads the image file generated by the image reading unit to the server apparatus, wherein the setup information includes count mode information indicating a counting state of the number of files when executing uploading of image files in parallel, the upload unit uploads the image files such that the count value becomes equal to or smaller than a limiting variable, which is set in advance, while counting the image files uploaded in parallel, when the count mode information indicates a first mode, the upload unit decreases the count value when uploading of the image file ends, when the count mode information indicates a second mode, the display controller controls the display to display a fourth screen that shows an execution result of the upload when the upload unit executes uploading of the image file and that is a screen for receiving a confirmation operation indicating that the screen has been confirmed, the detector detects the confirmation operation while the fourth screen is displayed by the display, and the upload unit decreases the count value when the confirmation operation is detected by the detector.

13. The information processing apparatus according to claim 12, wherein the setup information includes count mode information indicating a counting state of the number of files when executing uploading of image files in parallel, the upload unit uploads the image files such that the count value becomes equal to or smaller than a limiting variable, which is set in advance, while counting the image files uploaded in parallel, when the count mode information indicates a first mode, the upload unit decreases the count value when uploading of the image file ends, when the count mode information indicates a second mode, the display controller controls the display to display a fourth screen that shows an execution result of the upload when the upload unit executes uploading of the image file and that is a screen for receiving a confirmation operation indicating that the screen has been confirmed, the detector detects the confirmation operation while the fourth screen is displayed by the display, and the upload unit decreases the count value when the confirmation operation is detected by the detector.

* * * * *